United States Patent
Hakoda et al.

(10) Patent No.: US 7,041,242 B2
(45) Date of Patent: May 9, 2006

(54) MOLD-CLAMPING CONTROL METHOD FOR INJECTION MOLDING MACHINE

(75) Inventors: Takashi Hakoda, Nagano (JP); Yoshito Aruga, Nagano (JP)

(73) Assignee: Nissei Plastic Industrial Co., Ltd., Nagano (JP)

( * ) Notice: Subject to any disclaimer, the term of this patent is extended or adjusted under 35 U.S.C. 154(b) by 170 days.

(21) Appl. No.: 10/834,008

(22) Filed: Apr. 29, 2004

(65) Prior Publication Data
US 2004/0219256 A1    Nov. 4, 2004

(30) Foreign Application Priority Data
May 2, 2003   (JP) ............................. 2003-127398

(51) Int. Cl.
*B29C 45/64*    (2006.01)
*B29C 45/80*    (2006.01)

(52) U.S. Cl. ................. 264/40.1; 264/40.5; 264/328.1; 425/137; 425/150; 425/154

(58) Field of Classification Search ............... 264/40.1, 264/40.5, 328.1; 425/137, 138, 150, 589, 425/595, 154
See application file for complete search history.

(56) References Cited

U.S. PATENT DOCUMENTS

| | | | | |
|---|---|---|---|---|
| 4,038,003 A | * | 7/1977 | Hansson | 425/137 |
| 4,710,119 A | * | 12/1987 | Otake | 425/136 |
| 6,057,661 A | * | 5/2000 | Iwashita | 318/563 |

FOREIGN PATENT DOCUMENTS

JP    2002-172670 A    6/2002

\* cited by examiner

*Primary Examiner*—Jill L. Heitbrink
(74) *Attorney, Agent, or Firm*—Birch, Stewart, Kolasch & Birch, LLP

(57) ABSTRACT

The value of a monitor item is detected in a monitor region predetermined in relation to a mold closing operation during the course of a mold clamping step. Emergency processing is performed when the detected value exceeds a threshold value. There are preset an anomalous-state mold opening velocity higher than a normal-state mold opening velocity on the basis of which mold opening control is performed in a normal state, and an anomalous-state-velocity end position at which mold opening control based on the anomalous-state mold opening velocity is ended. Mold opening control based on the anomalous-state mold opening velocity is performed in a portion of the monitor region ranging from a point corresponding to time when the detection value has exceeded the threshold value, to a point corresponding to the anomalous-state-velocity end position.

12 Claims, 9 Drawing Sheets

| SHOT COUNT | SAMPLING ORDER | | | |
|---|---|---|---|---|
| | t0 | t1 | ... | tn |
| 1 | 11.0 | 12.0 | ... | 12.0 |
| 2 | 11.2 | 12.2 | ... | 12.1 |
| 3 | 11.1 | 11.8 | ... | 12.3 |
| 4 | 11.2 | 11.9 | ... | 11.8 |
| 5 | 11.2 | 11.9 | ... | 12.1 |
| 6 | 11.5 | 12.1 | ... | 12.2 |
| 7 | 11.6 | 11.2 | ... | 11.8 |
| 8 | 11.3 | 11.5 | ... | 11.9 |
| 9 | 11.2 | 10.8 | ... | 12.0 |
| 10 | 11.0 | 11.3 | ... | 12.1 |
| AVERAGE VALUE Xi | 11.2 | 11.7 | ... | 12.0 |
| MAXIMUM VALUE Xw | 11.6 | 12.5 | ... | 12.3 |

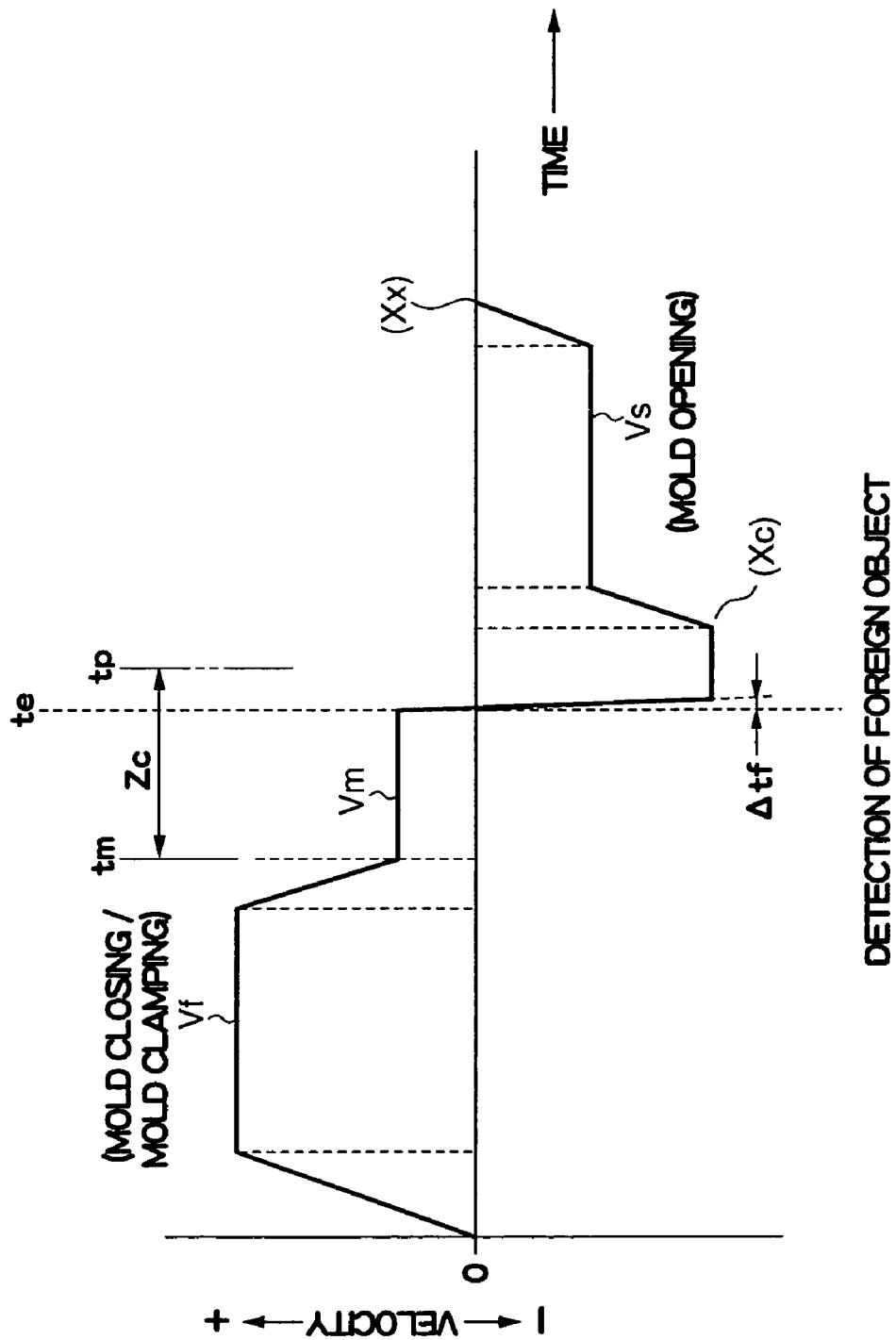

MOLD-CLAMPING CONTROL METHOD FOR INJECTION MOLDING MACHINE

This Non-provisional application claims priority under 35 U.S.C. § 119(a) on Patent Application No(s). 2003-127398 filed in Japan on May 2, 2003, the entire contents of which are hereby incorporated by reference.

BACKGROUND OF THE INVENTION

1. Field of the Invention

The present invention relates to a mold-clamping control method for an injection molding machine, which method is favorably used in detecting a foreign object that is caught between a movable mold and a stationary mold during the course of a mold clamping step.

2. Description of the Related Art

Conventionally, in the field of an injection molding machine designed such that reciprocating motion produced by a drive unit composed of a servomotor and a ball-screw mechanism is transmitted to a movable platen via a toggle link mechanism, there has been known a foreign-object detection method for detecting a foreign object (e.g., a molded product) that is caught between a movable mold and a stationary mold upon movement of the movable platen in a mold closing direction (see, for example, Japanese Patent Application Laid-Open (kokai) No. 2002-172670).

The patent publication discloses a foreign-object detection method for an injection molding machine, including the steps of detecting a physical value related to a mold closing action in a monitor region during the course of a mold clamping step; and performing emergency processing, such as stopping of a servomotor, a retreat operation, and generation of an alarm, when a deviation between the detected physical value and a predetermined theoretical value is in excess of a threshold value. Notably, the threshold value is determined as follows: a trial mold clamping operation is performed to thereby detect a maximum value of the deviation; and the maximum value is added to a preset reference value to thereby determine a threshold value to be used for foreign object detection.

In the foreign-object detection method (mold-clamping control method), a physical value related to a mold closing action in a monitor region is detected; and when a deviation between the detected physical value and the predetermined theoretical value is in excess of the preset threshold value, emergency processing is performed. Therefore, a time lag arises before emergency processing is performed after a foreign object (a molded object) is caught between a movable mold and a stationary mold. A long time lag causes various drawbacks; for example, accurate monitoring of a molded product cannot be performed because of breakage of a molded product, or a mold may be damaged. Therefore, shortening the time lag to the greatest possible extent is preferred.

However, in a conventional foreign-object detection method, after a servomotor is caused to stop operating, a retreat operation is performed under ordinary mold-opening control; thus, an unignorably long time lag is involved. As a result, the conventional method fails to reliably avoid occurrence of, for example, breakage of a molded product and damage to a mold.

SUMMARY OF THE INVENTION

An object of the present invention is to provide a mold-clamping control method for an injection molding machine in which a time lag between detection of a foreign object and start of emergency processing is shortened so that emergency processing can be performed promptly.

Another object of the present invention is to provide a mold-clamping control method for an injection molding machine capable of reliably avoiding occurrence of, for example, breakage of a caught molded product (a caught foreign object) and damage to a mold.

To achieve the above objects, the present invention provides a mold-clamping control method for an injection molding machine, comprising the steps of detecting a value of a monitor item in a monitor region predetermined in relation to a mold closing operation during the course of a mold clamping step; performing emergency processing when the detected value exceeds a threshold value; presetting an anomalous-state mold opening velocity higher than a normal-state mold opening velocity on the basis of which mold opening control is performed in a normal state, and an anomalous-state-velocity end position at which mold opening control on the basis of the anomalous-state mold opening velocity is ended; and performing the mold opening control on the basis of the anomalous-state mold opening velocity in a portion of the monitor region ranging from a point corresponding to time when the detection value has exceeded the threshold value, to a point corresponding to the anomalous-state-velocity end position.

BRIEF DESCRIPTION OF THE DRAWINGS

FIG. 10 is a time chart showing velocity in relation to mold closing and mold opening during performance of the mold-clamping control method.

DETAILED DESCRIPTION OF THE PREFERRED EMBODIMENT

An embodiment of the present invention will next be described in detail with reference to the drawings. The accompanying drawings are illustrative of the embodiment and are not meant to limit the scope of the invention. In order to describe the invention clearly, detailed description of known parts is omitted.

First, the structure of an injection molding machine 1 to which a mold-clamping control method of the present embodiment can be applied will be described with reference to FIGS. 5 and 6.

Figure 5:
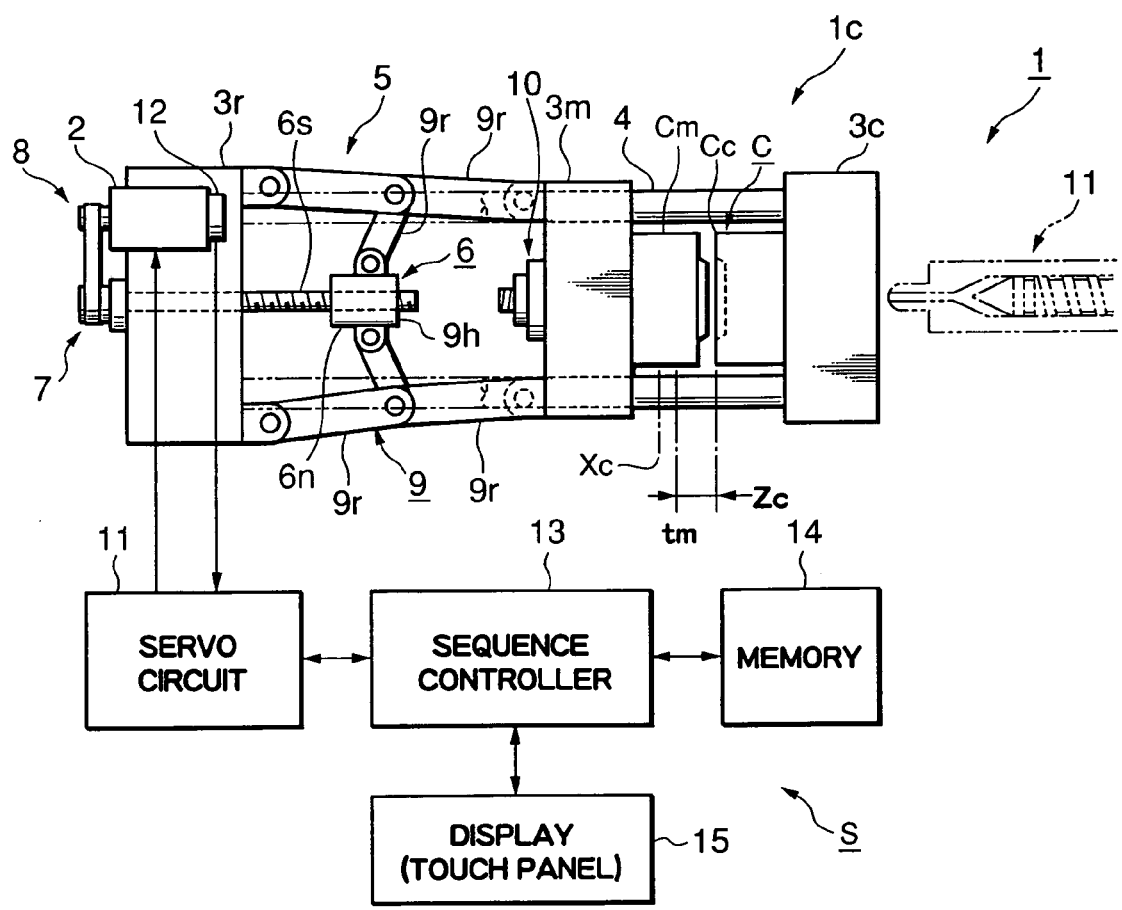
FIG. 5 is a view showing the structure of an injection molding machine to which the mold-clamping control method can be applied.

The injection molding machine 1 shown in FIG. 5 includes a mold clamping apparatus 1c, and an injection apparatus 1i indicated by an imaginary line. The mold clamping apparatus 1c includes a stationary platen 3c and a drive base 3r which are separated from each other. The stationary platen 3c and the drive base 3r are fixedly mounted on an unillustrated machine base. Four tie bars 4 extend between the stationary platen 3c and the drive base 3r. A movable platen 3m is mounted slidably on the tie bars 4. A movable mold Cm is attached to the movable platen 3m, and a stationary mold Cc is attached to the stationary platen 3c. The movable mold Cm and the stationary mold Cc constitute a mold C.

A drive mechanism 5 is disposed between the drive base 3r and the movable platen 3m. The drive mechanism 5 includes a drive unit 8, and a toggle link mechanism 9 attached between the drive base 3r and the movable platen 3m. The drive unit 8 includes a servomotor 2 attached to the drive base 3r; a ball screw mechanism 6 composed of a ball screw 6s rotatably supported on the drive base 3r and a nut 6n in screw-engagement with the ball screw 6s; and a rotation transmission mechanism 7 for transmitting rotation of the servomotor 2 to the ball screw 6s. The toggle link mechanism 9 is composed of a plurality of toggle link members 9r; and the nut 6n is fixed to a cross head 9h serving as an input portion. By virtue of the above-described configuration, reciprocating motion of the nut 6n is transmitted to the movable platen 3m via the toggle link mechanism 9. Reference numeral 10 denotes an ejector mechanism.

Meanwhile, reference letter S denotes a control system. The control system S includes a servo circuit 11, to which are connected the servomotor 2 and a rotary encoder 12 attached to the servomotor 2. A sequence controller 13 is connected to the servo circuit 11; and memory 14 and a display 15 having a touch panel are connected to the sequence controller 13.

Figure 6:
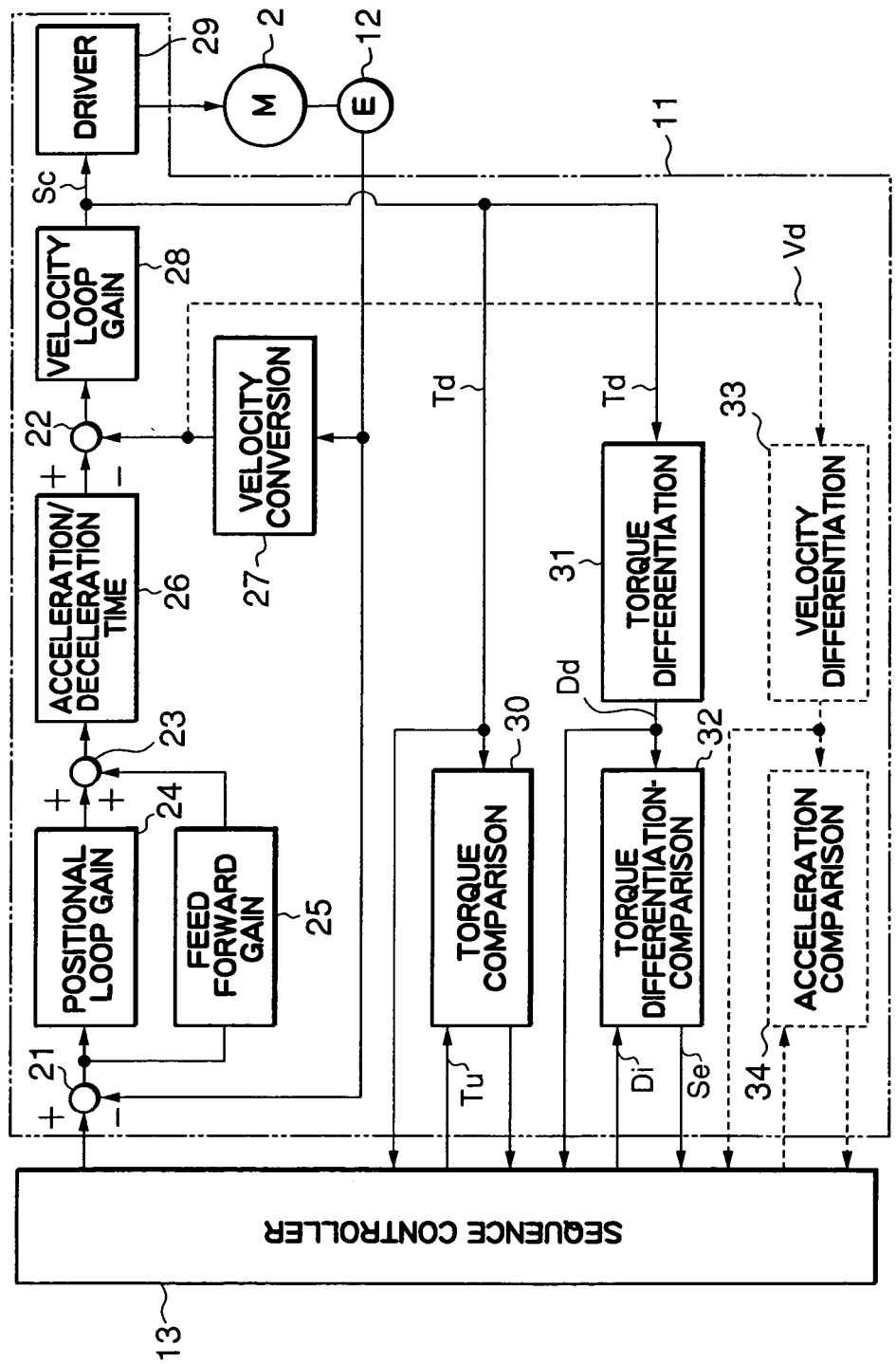
FIG. 6 is a block diagram of a servo circuit of the injection molding machine.

FIG. 6 shows a specific configuration of the servo circuit 11. The servo circuit 11 includes deviation calculation units 21 and 22; an adder 23; a positional-loop-gain setting unit 24; a feed-forward-gain setting unit 25; an acceleration/deceleration-time setting unit 26; a velocity converter 27; a velocity-loop-gain setting unit 28; a driver 29; a torque comparison section 30; a torque differentiator 31; a torque differentiation-comparison section 32; a velocity differentiator 33; and an acceleration comparison section 34, to thereby constitute the servo control system as shown in FIG. 6. The functions (operations) of the respective portions will be described in relation to overall operation of the mold clamping apparatus 1c, which will be described later.

Next, overall operation of the mold clamping apparatus 1c which employs the mold-clamping control method according to the present embodiment will be described with reference to FIGS. 1 to 10.

Figure 2:
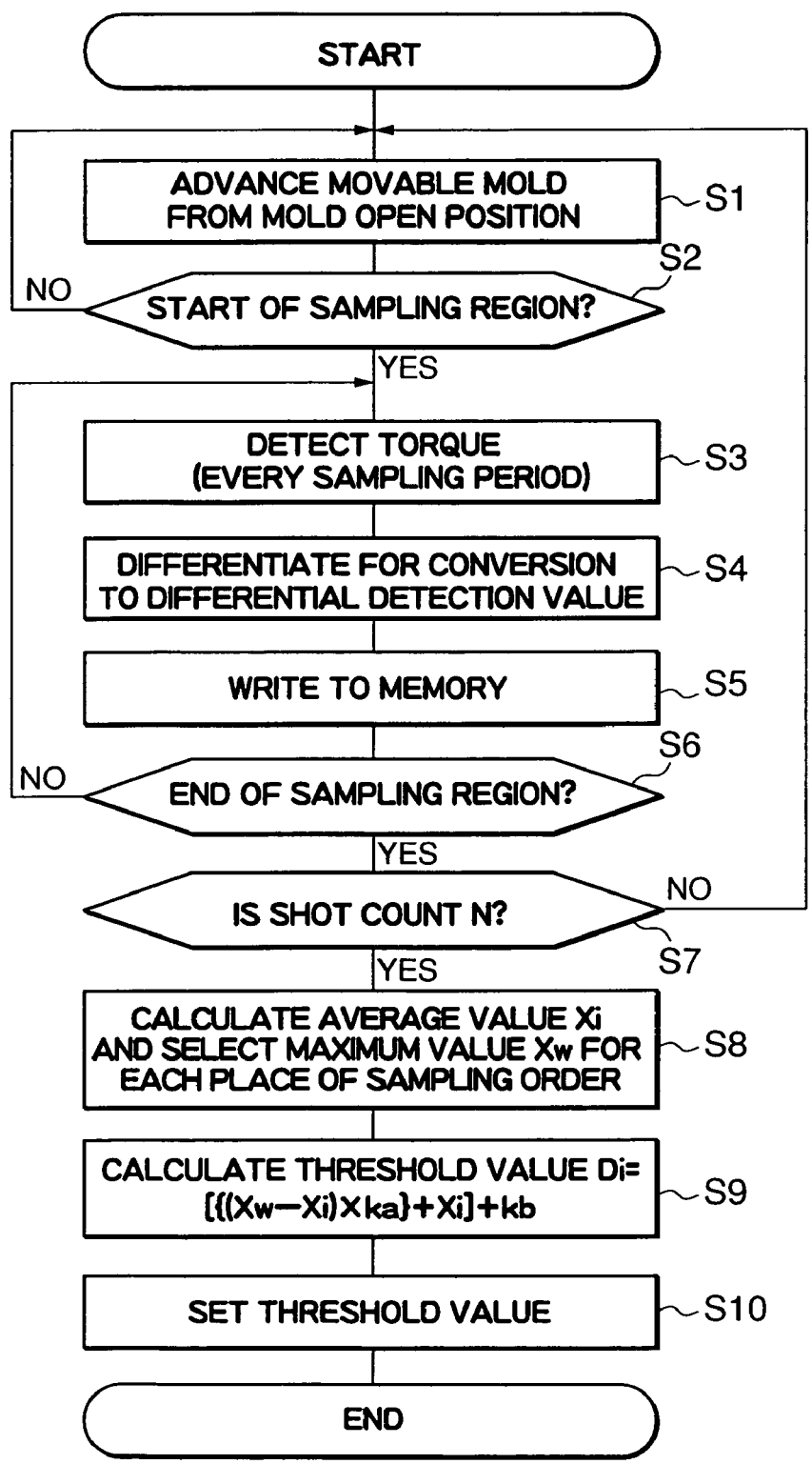
FIG. 2 is a flowchart showing a method of setting a threshold value used in the mold-clamping control method.

First, a method of setting a threshold value Di used in the mold-clamping control method according to the present embodiment will be described with reference to the flowchart of FIG. 2.

When the mold-clamping control method according to the present embodiment is to be performed, the automatic setting mode is selected by means of a relevant function key displayed on the display 15. Selection of the automatic setting mode causes initialization of the threshold value Di. This initialization can usually be performed through trial molding. Here, we assume that the movable platen 3m is located at the mold open position before start of the operation of the injection molding machine 1. Start of trial molding activates the servomotor 2, and the movable platen 3m is advanced from the mold open position (step S1). In this case, as shown in FIG. 10, initially, the movable platen 3m is advanced at high speed (velocity Vf) in the mold closing direction, whereby high-speed mold closing is effected. At this time, the servo circuit 11 performs velocity control and position control on the movable platen 3m. Specifically, the sequence controller 13 supplies a position command value to the deviation calculation unit 21 of the servo circuit 11. The deviation calculation unit 21 compares the position command value with a position detection value obtained from detection pulses output from the rotary encoder 12. Thus, there is obtained a positional deviation, on the basis of which position feedback control is performed. Notably, the positional deviation is compensated by the positional-loop-gain setting unit 24, the feed-forward-gain setting unit 25, and the acceleration/deceleration-time setting unit 26. An output of the acceleration/deceleration-time setting unit 26 is supplied to the deviation calculation unit 22 and compared with an output of the velocity converter 27. Thus, there is obtained a velocity deviation, on the basis of which velocity feedback control is performed. Notably, the velocity deviation is compensated by the velocity-loop-gain setting unit 28.

When the movable platen 3m is advanced in the mold closing direction and reaches a start point of a predetermined sampling region (monitor region Zc), detection of a monitor item starts; specifically, torque (load torque), which is a monitor item, is periodically detected at predetermined sampling intervals $\Delta ts$ (steps S2 and S3). In this case, the sampling region can be set between a start point tm of low-pressure mold clamping (low-velocity mold closing: velocity Vm) and a start point tp of high-pressure mold clamping. These start points tm and tp may be set in terms of either position or time. Notably, the sampling intervals $\Delta ts$ can be set to, for example, 2.5 ms. When the duration of the sampling region is assumed to be 8 seconds, the total sampling count is 3,200.

Load torque is detected by extracting a velocity control signal from the velocity-loop-gain setting unit 28. In other words, since the magnitude of the velocity control signal S corresponds to the magnitude of load torque, the voltage of the velocity control signal Sc is used as the torque detection value Td. The torque detection value Td that is periodically detected at the sampling intervals $\Delta ts$ is differentiated by the torque differentiator 31 to thereby be converted to a differential detection value Dd. The differential detection value Dd is written to a data area of the memory 14 via the sequence controller 13 (steps S4 and S5). A detecting operation for obtaining the differential detection value Dd is periodically performed at the sampling intervals $\Delta ts$ until the sampling region ends (steps S6, S3, etc.).

Figures 8, 9:
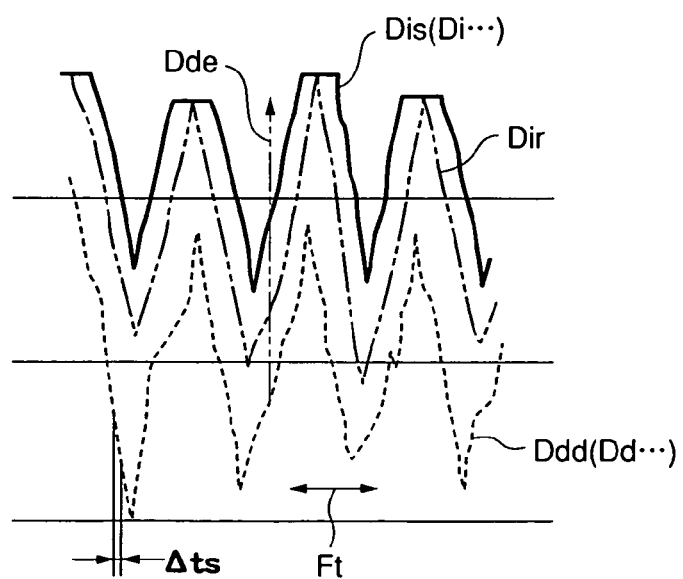
FIG. 8 is a table of detection values obtained through performance of the mold-clamping control method.
FIG. 9 is a diagram for explaining a method of selecting a maximum value during performance of the mold-clamping control method.

When the first shot (molding cycle) is completed, the next shot is performed. Similarly, the differential detection value Dd is obtained through detection. Detection for obtaining the differential detection value Dd is performed for each of a predetermined number (N) of shots (steps S7, S3, etc.). FIG. 8 is a table of the differential detection values Dd contained in the data area of the memory 14. In the present embodiment, the shot count N is set to "10," and sampling is performed in the sampling, order of t), t1, . . . , tn for a single shot.

When detection is completed for all of N shots, an average value Xi is calculated from the obtained differential detection values Dd that pertain to the same place of sampling order with respect to all of the shots (step S8). In FIG. 8, the average value Xi for the differential detection values Dd that pertain to, for example, the place t1 of sampling order (with respect to 10 shots) is "11.7." A maximum value Xw is selected from the differential detection values Dd that pertain to the same place of sampling order with respect to all of the shots (step S8). In FIG. 8, the maximum value Xw for, for example, the place t1 of sampling order is "12.5."

In this case, the maximum value Xw is a greatest value selected from the differential detection values Dd that pertain to a plurality of places of sampling order consisting of the place concerned and a predetermined number of preceding and subsequent places of sampling order. The reason for this will be described with reference to FIG. 9. In the case where the maximum value is selected from values that pertain to the same place of sampling order, threshold value data vary as represented by Dir in FIG. 9, which graphs the threshold values Di in a time series manner. The threshold value data Dir vary with a tendency similar to that of detection value data Ddd shown in FIG. 9 except that the threshold value data Dir is offset upward from the detection value data Ddd. The detection value data Ddd is represented by graphing the differential detection values Dd in a time series manner. However, the detection data Ddd do not necessarily appear synchronously with the threshold value data Dir in a time axis direction Ft; e.g., are dispersed in a time axis direction Ft, but are dispersed in a time axis direction Ft; e.g., the detection data Ddd involve time lag. As a result, in some cases, the detection value data Ddd may exceed the threshold value data Dir at a certain point in the time axis direction Ft, resulting in occurrence of erroneous detection.

The above problem is avoided as follows. The maximum value Xw is a greatest value selected from the values that pertain to a plurality of places of sampling order consisting of the place concerned and a predetermined number of preceding and subsequent places of sampling order, thereby expanding a peak value of the threshold value data Dir along a predetermined time span in the time axis direction Ft as represented by threshold value data Dis in FIG. 9. In this case, the range of expansion (a predetermined range) can be arbitrarily set by selecting a numerical value, such as 1, 2, 3, 4 . . . For example, when "1" is selected, one preceding place of sampling order and one subsequent place of sampling order are added to the place concerned. Thus, when "1" is selected, the predetermined range means three consecutive places of sampling order. Specifically, when the maximum value Xw is to be selected for the place t1 of sampling order, a maximum value is selected, for use as the maximum value Xw, from the values that pertain to the t0, t1, and t2 places of sampling order. Similarly, when "2" is selected, two preceding places of sampling order and two subsequent places of sampling order are added to the place concerned. Thus, the predetermined range means five consecutive places of sampling order. Notably, FIG. 8 shows an example case where the maximum value Xw for the place t1 of sampling order is a maximum value (not shown) appearing in the place t2 of sampling order.

The thus-obtained average value Xi and maximum value Xw are used to obtain the threshold value Di for each place of sampling order by use of the following arithmetic expression (step S9):

$$Di = Pi + kb$$
$$= [\{(Xw - Xi) \times ka\} + Xi] + kb$$

(where ka and kb are constants)

In this case, Pi is a reference value; and the constant kb is used to set a predetermined allowance (offset) for the reference value Pi. The constant ka can usually be set to an arbitrary value ranging from "1 to 2."

In place of the average value Xi, a median Xj can be used. Specifically, a minimum value Xs and a maximum value Xw are obtained from the differential detection values Dd that pertain to the same place of sampling order with respect to all of the shots; the median Xj is obtained, on the basis of the minimum value Xs and the maximum value Xw, by use of the arithmetic expression $Xj = (Xw - Xs)/2$; and the threshold value Di for each place of sampling order is obtained, on the basis of the median Xj and the maximum value Xw, by use of the following arithmetic expression:

$$Di = [\{(Xw - Xj) \times ka\} + Xj] + kb$$

(where ka and kb are constants)

In the above arithmetic expression, the constants ka and kb may be identical to the aforementioned constants ka and kb or may differ from them as needed.

Figure 7:
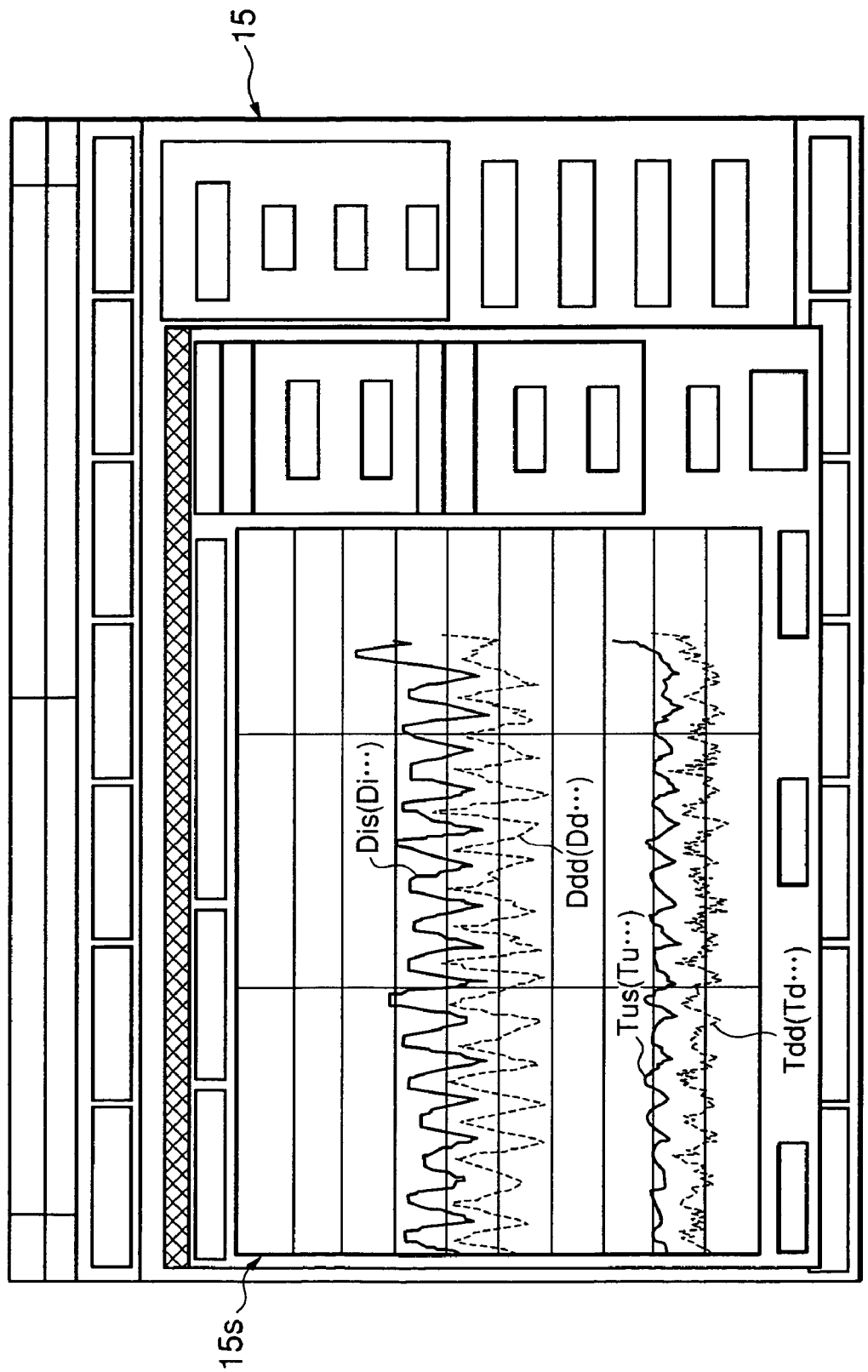
FIG. 7 is a diagram showing a display screen used during performance of the mold-clamping control method.

The thus-obtained threshold values Di are set in the memory 14 and displayed on a data display section 15s of the display 15 shown in FIG. 7 (step 510). In FIG. 7, Dis indicates threshold value data represented by graphing the set threshold values Di. The above-described series of operations for obtaining the threshold values Di (threshold value data Dis) is performed fully automatically by means of sequence operations.

Meanwhile, upon obtainment of the torque detection value Td, a torque limit value Tu is automatically set for use in performing torque limitation in a monitor region Zc during the course of a mold clamping step. Specifically, the torque detection value Td is written to the data area of the memory 14 via the sequence controller 13. In this case, a series of operations for obtaining the torque detection value Td is performed similarly as in the case of the above-described differential detection value Dd. More specifically, the torque detection value Td is periodically obtained through periodical detection at the sampling intervals Δts in the sampling region. Detection for obtaining the torque detection value Td is performed for each of N shots. When the detection is completed for all of N shots, an average value Ai is calculated from the torque detection values Td that pertain to the same place of sampling order with respect to all of the shots. Also, a maximum value Aw is selected. As in the case of the above-described differential detection value Dd, the maximum value Aw is a greatest value selected from the torque detection values Td that pertain to a plurality of places of sampling order consisting of the place concerned and a predetermined number of preceding and subsequent places of sampling order. The thus-obtained average value Ai and maximum value Aw are used to obtain the torque limit value Tu for each place of sampling order by use of the following arithmetic expression:

$$Tu = Qi + kq$$
$$= [\{Aw - Ai) \times kp\} + Ai] + kq$$

(where kp and kq are constants)

In this case, Qi is a reference value; and the constant kq is used to set a predetermined allowance (offset) for the reference value Qi. The constant kp can usually be set to an arbitrary value ranging from "1 to 2."

Notably, the torque limit value Tu can also be obtained in the following manner. A minimum value As and the maximum value Aw are obtained from the torque detection values Td that pertain to the same place of sampling order with respect to all of the shots; a median Aj is obtained, on the basis of the minimum value As and the maximum value Aw, by use of the arithmetic expression Aj= (Aw−As)/2; and the torque limit value Tu for each place of sampling order is obtained, on the basis of the median Aj and the maximum value Aw, by use of the following arithmetic expression:

$$Tu = Qi + kq$$
$$= [\{(Aw - Aj) \times kp\} + Aj] + kq$$

(where kp and kq are constants)

In the above arithmetic expression, the constants kp and kq may be identical to the aforementioned constants kp and kq or may differ from them as needed.

The thus-obtained torque limit values Tu are set in the memory 14 and displayed on the data display section 15s of the display 15 shown in FIG. 7. In FIG. 7, Tus indicates torque limit value data represented by graphing the set torque limit values Tu. The above-described series of operations for obtaining the torque limit values Tu (torque limit value data Tus) is performed fully automatically by means of sequence operations.

Figure 3:
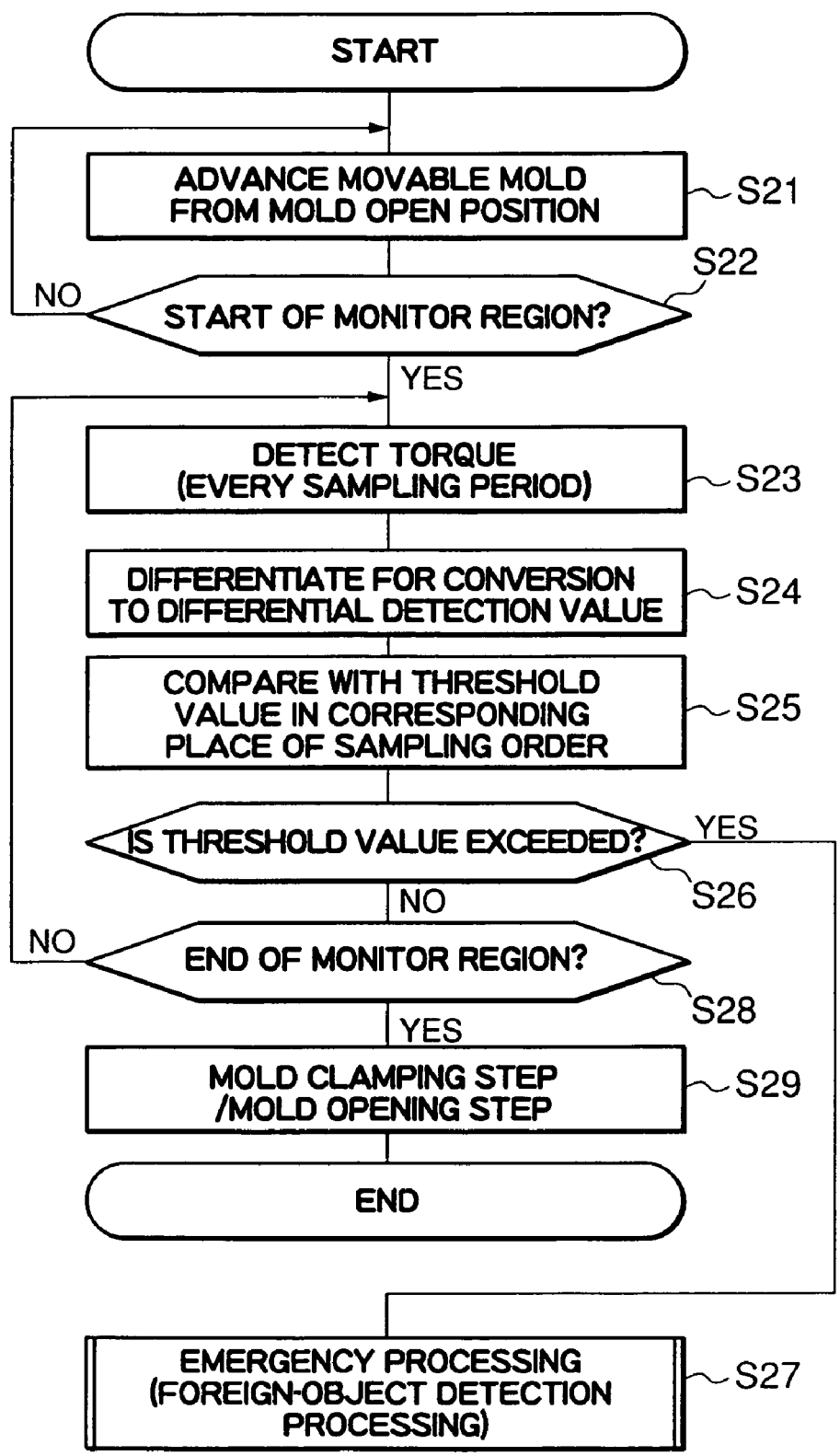
FIG. 3 is a flowchart showing the mold-clamping control method in relation to overall operation during a production run.

Next, overall operation of the injection molding machine during a production run will be described with reference to the flowchart shown in FIG. 3.

Here, we assume that the movable platen 3m of the mold clamping apparatus 1c is located at the mold open position before start of the operation of the injection molding machine 1. In a mold clamping step, the servomotor 2 is activated, and the movable platen 3m is advanced from the mold open position (step S21). In this case, as shown in FIG. 10, initially, the movable platen 3m is advanced at high speed (velocity Vf) in the mold closing direction, whereby high-speed mold closing is effected. As in the aforementioned case where the threshold value Di is initialized, the servo circuit 11 performs velocity control and position control on the movable platen 3m. When the movable platen 3m shifts to low-speed mold closing, during which the movable platen 3m moves at low speed (velocity Vm), and reaches the predetermined monitor region Zc, torque (load torque) is periodically detected at the aforementioned sampling intervals Δts (steps S22 and S23). The monitor region is identical to the aforementioned sampling region.

As in the case where the threshold value Di is initialized, torque is detected through extraction of the velocity control signal Sc from the velocity-loop-gain setting unit 28. The torque detection value Td that is thus-obtained periodically at the sampling intervals Δts is supplied to the torque differentiator 31 and differentiated by the differentiator 31 to thereby be converted to the differential detection value Dd (step S24). The differential detection value Dd is supplied to the torque differentiation-comparison section 32. Meanwhile, the threshold value Di identical in a place of sampling order with the differential detection value Dd is supplied to the torque differentiation-comparison section 32 from the sequence controller 13. Thus, the torque differentiation-comparison section 32 compares the threshold value Di and the differential detection value Dd that pertain to the same place of sampling order (step S25).

Here, we assume that, at time te in the monitor region Zc shown in FIG. 10, a foreign object is caught between the movable mold Cm and the stationary mold Cc. In this case, since load torque increases sharply at the time of catching a foreign object, the magnitude of the velocity control signal Ss also increases sharply. Thus, the differential detection value Dd obtained from the torque differentiator 31 increases abruptly and exceeds the threshold value data Dis as represented by Dde in FIG. 9. The torque differentiation-comparison section 32 judges from the abrupt increase that a foreign object has been caught, and the servo circuit 11 supplies a foreign-object detection signal Se to the sequence controller 13. In response thereto, the sequence controller 13 performs predetermined emergency processing promptly (steps S26 and S27).

Figure 1:
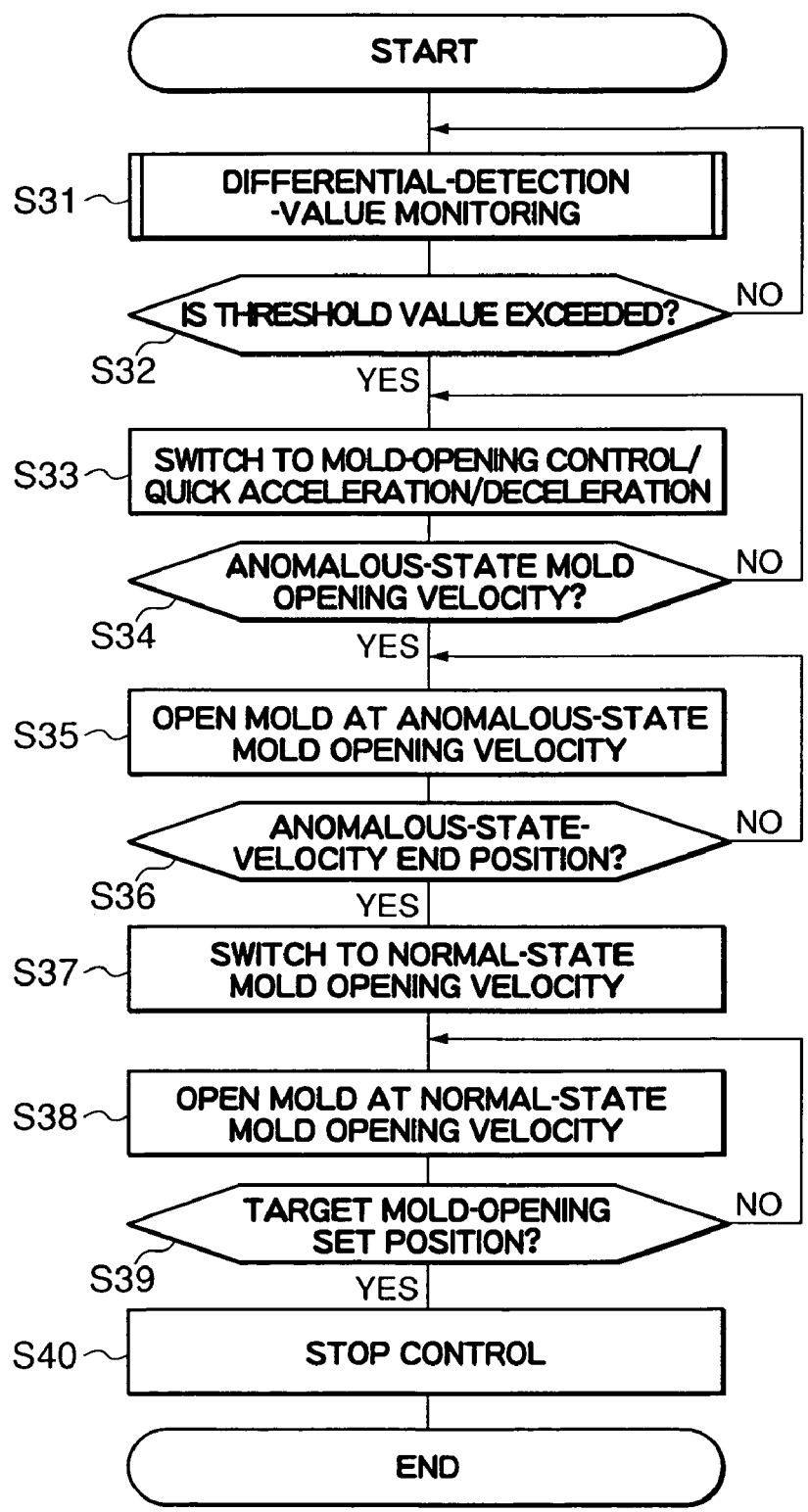
FIG. 1 is a flowchart showing an emergency processing procedure of a mold-clamping control method according to an embodiment of the present invention.

Next, emergency processing will be described with reference to the flowchart of FIG. 1. In FIG. 1, step S31 corresponds to steps S21 to S25 in the flowchart of FIG. 3, and step S32 corresponds to step S26 of the flowchart of FIG. 3.

First, the sequence controller 13 presets an anomalous-state mold opening velocity Vn higher than a normal-state mold opening velocity Vs on the basis of which mold opening control is performed in a normal state, and an anomalous-state-velocity end position Xc at which mold opening control on the basis of the anomalous-state mold opening velocity Vn is ended. In this case, the anomalous-state mold opening velocity Vs is set to a maximum velocity of the servomotor 2 that is determined on the basis of the drive capability of the servomotor 2; and, as shown in FIG. 5, the anomalous-state-velocity end position Xc is set so as to precede a start point tm of the monitor region Zc.

When the detection value Dd exceeds the threshold value Di in the monitor region Zc, the servo circuit 11 supplies a foreign-object detection signal Se to the sequence controller 13. In response thereto, the sequence controller 13 immediately performs mold opening control without performance of stop control. Specifically, the sequence controller 13 supplies to the servo circuit 11 a velocity command and a position command for emergency operation. The servo circuit 11 switches a control mode from control based on velocity Vm in the mold closing direction to control based on the anomalous-state mold opening velocity Vn in the mold opening direction and performs acceleration/deceleration control in a shortest time Δtf determined on the basis of the drive capability of the servomotor 2 until the anomalous-state mold opening velocity Vn is reached (step S33). Thus, in the midst of low-speed movement in the mold closing direction, the movable mold Cm (movable platen 3m) immediately starts retreating in the mold opening direction, thereby enhancing the effect of shortening time lag. Mold opening control is performed on the basis of the anomalous-state mold opening velocity Vn until the movable mold Cm reaches the anomalous-state-velocity end position Xc (steps S34 and S35).

When the movable mold Cm (movable platen 3m) reaches the anomalous-state-velocity end position Xc, the anomalous-state mold opening velocity Vn is switched to the normal-state mold opening velocity Vs on the basis of which normal-state mold opening control is performed. Mold opening control is performed on the basis of the normal-state mold opening velocity Vs until the movable mold Cm reaches a mold-opening set position Xx, which is a final target destination (steps S36, S37, and S38). When the movable mold Cm reaches the mold-opening set position Xx, stop control is performed (steps S39 and S40). In emergency processing, in addition to the above-described control on the movable mold Cm (movable platen 3m), predetermined emergency processing operations such as generation of an alarm are performed (step S27 in FIG. 3).

By contrast, when a normal operation continues without presence of a foreign object, the operation of detecting the differential detection value Dd is repeated at the preset sampling intervals Δts, since the detection value data Ddd do not exceed the threshold value data Dis (steps S28, S23, etc.). When the end of the monitor region Zc is reached, and then the movable platen 3m reaches a low-pressure end position at which low-pressure mold clamping is to be ended; i.e., a high-pressure mold clamping start position, high-pressure mold clamping is performed by means of high-pressure control; and when a predetermined molding operation is completed, a mold opening operation is performed (steps S28 and S29). Notably, Ddd in FIG. 7 indicates detection value data represented by graphing the differential detection values Dd.

Meanwhile, the torque detection value Td that is periodically obtained through periodical detection at the sampling intervals Δts is supplied to the torque comparison section 30. The torque limit value Tu identical in a place of sampling order with the torque detection value Td is supplied to the torque comparison section 30 from the sequence controller 13. Thus, the torque comparison section 30 compares the torque limit value Tu and the torque detection value Td that pertain to the same place of sampling order. When the torque detection value Td increases and reaches the torque limit value Tu, the sequence controller 13 and the servo circuit 11 performs torque control (torque limiting operation) so as to prevent the torque detection value Td from exceeding the torque limit value Tu. Notably, Tdd in FIG. 7 indicates torque detection value data represented by graphing the torque detection values Td.

Figure 4:
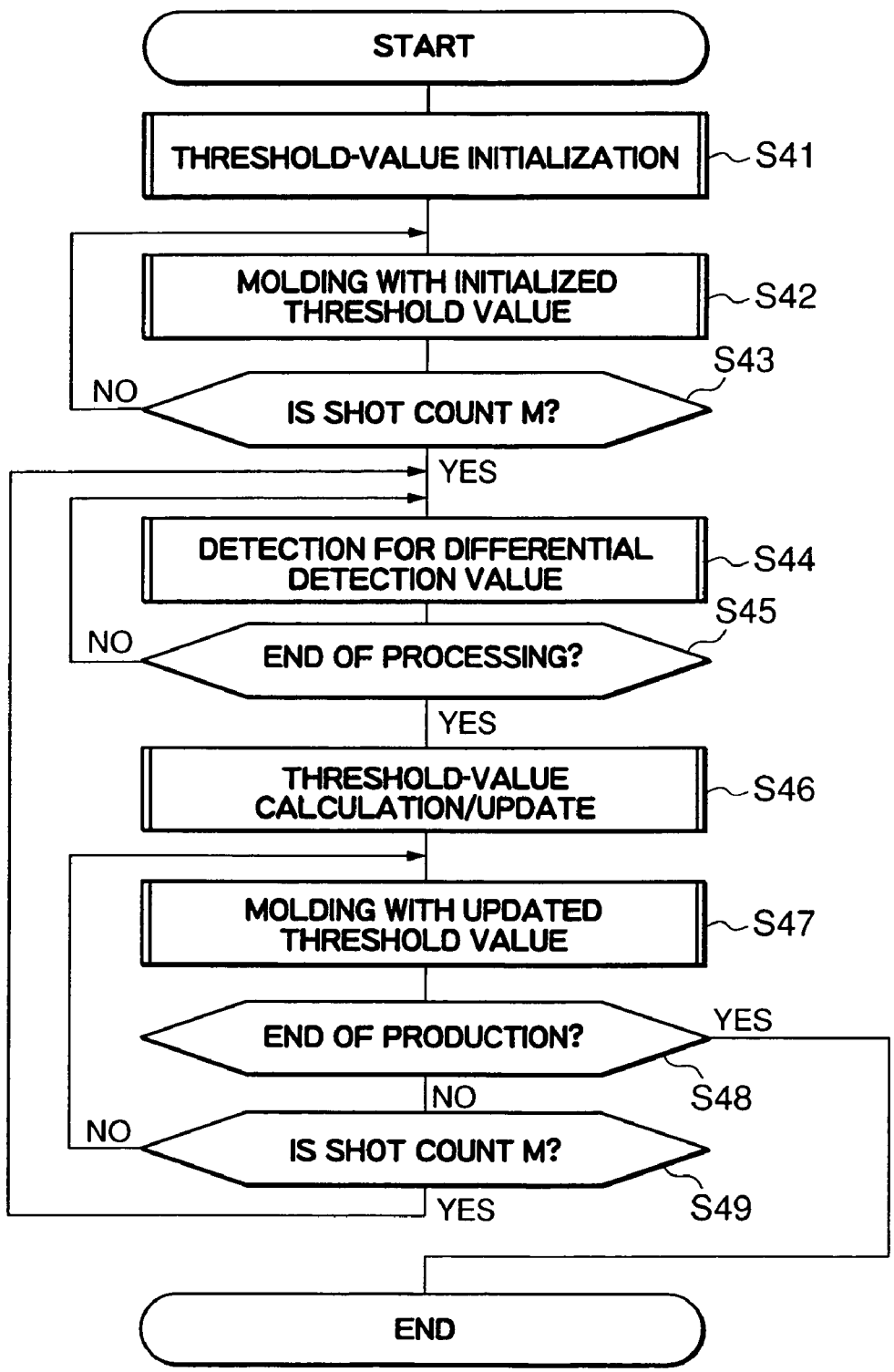
FIG. 4 is a flowchart showing a method of updating threshold data used in the mold-clamping control method.

Next, a method of updating the threshold value Di (threshold value data Dis) will be described with reference to the flowcharts shown in FIG. 4.

In the case where the injection molding machine 1 is automatically operated in a 24-hour run mode, the magnitude of torque varies depending on an hour of the day because of, for example, temperature variations between day and night. Thus, even when the threshold data Dis is set properly, erroneous detection may occur at a certain hour of the day during a production run. In order to cope with such a problem, in the present embodiment, each time the number of shots reaches a preset count M, the aforementioned automatic setting mode is effected; specifically, processing is performed in accordance with the flowchart shown in FIG. 2 so as to periodically update (automatically update) the threshold data Dis. The count M can be set to, for example, "100."

In this case, unless an anomalous event (detection of a foreign object) arises, the automatic setting mode can be effected while production is maintained, thereby updating the threshold value data Dis. In FIG. 4, step S41 refers to an operation of initializing the threshold value data Dis in accordance with the flowchart of FIG. 2. When the threshold value Di (threshold value data Dis) is initialized, a molding operation is performed by use of the initialized threshold value Di (threshold value data Dis) (step S42). When the number of shots reaches the preset count M, a detecting operation for obtaining the differential detection value Dd (detection value data Ddd) is performed (steps S43 and S44). In this case, the differential detection value Dd is extracted for each of N shots in accordance with the flowchart of FIG. 2. When the extracting operation is completed for all of N shots, new threshold value data Dis are obtained for update (steps S45 and S46).

When the threshold value Di (threshold value data Dis) is updated, a molding operation is similarly continued by use of the updated threshold value Di (threshold value data Dis) (step S47). Subsequently, a similar updating operation is repeated until production under a production scheme is completed. Specifically, as in the case of initialization, when the number of shots reaches the preset count M, a detecting operation for obtaining the differential detection value Dd is performed. The differential detection value Dd is extracted for each of N shots in accordance with the flowchart of FIG. 2. Subsequently, new threshold value data Dis are obtained for update (steps S48, S49, S44, etc.).

As described above, in the mold-clamping control method according to the present embodiment, mold opening control is performed on the basis of the anomalous-state mold opening velocity Vn in a time span of the monitor region Zc ranging from time te when the detection value Dd has exceeded the threshold value Di, to a point of time when the movable mold Cm has reached the anomalous-state-velocity end position Xc. Thus, a time lag between detection of a foreign object and start of emergency processing can be shortened. Therefore, emergency processing can be promptly started, so that occurrence of, for example, breakage of a caught molded product (a caught foreign object) and damage to a mold can be reliably avoided.

The mold-clamping control method according to the present embodiment employs an automatic setting mode and performs, in the automatic setting mode, the steps of periodically detecting torque (load torque) in the monitor region Zc at the preset sampling intervals Δts to thereby obtain the differential detection values Dd in sampling order; repeating the step of periodical detection for each of a preset number (N) of shots; obtaining the threshold values Di for individual places of sampling order, on the basis of the obtained differential detection values Dd, by use of a predetermined arithmetic expression; and setting the obtained threshold values Di for use in control. Thus, even when a disturbance causes variations in torque, erroneous detection of a foreign object can be reliably prevented, thereby avoiding unnecessary suspension of operation and ensuring high consistency and high reliability in terms of mold-clamping control. Particularly, the average value Xi and the maximum value Xw are obtained from the differential detection values Dd that pertain to the same place of sampling order with respect to all of the shots; and the thus-obtained average value Xi and maximum value Xw are used to obtain the threshold values Di for individual places of sampling order by use of the arithmetic expression $Di=[\{(Xw-Xi) \times ka\}+Xi]+kb$. Alternatively, the minimum value Xs and the maximum value Xw are obtained from the differential detection values Dd that pertain to the same place of sampling order with respect to all of the shots; the median Xj is obtained, on the basis of the minimum value Xs and the maximum value Xw, by use of the arithmetic expression $Xj=(Xw-Xs)/2$; and the threshold values Di are obtained, on the basis of the median Xj and the maximum value Xw, by use of the arithmetic expression $Di=[\{(Xw-Xj) \times ka\}+Xj]+kb$. Thus, accurate threshold values Di can be obtained reliably and consistently.

Furthermore, since the maximum value Xw is a greatest value selected from the values that pertain to a plurality of places of sampling order consisting of the place concerned and a predetermined number of preceding and subsequent places of sampling order, an allowance for dispersion in the time axis direction Ft can be preset, whereby erroneous detection, which could otherwise result from dispersion in the time axis direction Ft, can be avoided. Additionally, after the threshold values Di are set, every time the number of shots reaches the set count M, the threshold values Di are updated by performing the steps of the automatic setting mode. Thus, even when the magnitude of torque varies depending on an hour of the day because of, for example, temperature variations between day and night, erroneous detection can be reliably avoided. Furthermore, by using, as the detection value Dd, the differential detection value Dd obtained by differentiating the torque detection value Td corresponding to detected torque, the control method of the present embodiment can be free from any influence of an incident in which the entirety of the torque detection values Td is shifted because of, for example, a drift, thereby avoiding erroneous detection.

While the present invention has been described with reference to the preferred embodiment, the present invention is not limited thereto. Regarding structural details, technique, among others, modifications, addition, and any omission may be possible as needed without departing from the scope of the invention.

For example, the above-described embodiment uses, as a monitor item, torque of the servomotor 2 used for performing a mold closing operation. However, the present invention can be applied to the case in which velocity obtained from the velocity converter 27 shown in FIG. 6 is used as a monitor item. In this case, since the velocity detection value Vd is obtained from the velocity converter 27, the velocity detection value Vd is differentiated by means of the velocity differentiator 33 to thereby yield an acceleration value, and the thus-obtained acceleration value is used as the differential detection value Dd. Also, the acceleration comparison section 34 can be caused to perform processing similar to the aforementioned processing that is performed by the torque differentiation-comparison section 32. Also, no limitation is imposed on arithmetic expressions. Those other than the exemplified arithmetic expressions may be used as needed. Furthermore, the drive mechanism 5 of the embodiment includes the toggle link mechanism 9. However, the present invention can be applied to the case in which a direct-pressure-application type drive mechanism which does not use the toggle link mechanism is employed.

What is claimed is:

1. A mold-clamping control method for an injection molding machine, comprising:
   detecting a value of a monitor item in a monitor region predetermined in relation to a mold closing operation during the course of a mold clamping step;
   performing emergency processing when the detected value exceeds a threshold value;
   presetting an anomalous-state mold opening velocity higher than a normal-state mold opening velocity on the basis of which mold opening control is performed in a normal state, and an anomalous-state-velocity end position at which mold opening control on the basis of the anomalous-state mold opening velocity is ended; and
   performing the mold opening control on the basis of the anomalous-state mold opening velocity in a portion of the monitor region ranging from a point corresponding to time when the detection value has exceeded the threshold value, to a point corresponding to the anomalous-state-velocity end position.

2. A mold-clamping control method for an injection molding machine according to claim 1, wherein when the anomalous-state-velocity end position is reached, the mold opening control is performed on the basis of the normal-state mold opening velocity.

3. A mold-clamping control method for an injection molding machine according to claim 1, wherein the anomalous-state mold opening velocity is set to a maximum velocity that is determined on the basis of drive capability.

4. A mold-clamping control method for an injection molding machine according to claim 3, wherein acceleration/deceleration control is performed in a shortest time determined on the basis of the drive capability until the anomalous-state mold opening velocity is reached after the detection value has exceeded the threshold value.

5. A mold-clamping control method for an injection molding machine according to claim 1, wherein, when the detection value exceeds the threshold value, mold opening control is performed without performance of stop control.

6. A mold-clamping control method for an injection molding machine according to claim 5, wherein, in the mold opening control, a sequence controller supplies to a servo circuit a velocity command and a position command for emergency operation, and the servo circuit switches control based on velocity in a mold closing direction to control based on the anomalous-state mold opening velocity in a mold opening direction.

7. A mold-clamping control method for an injection molding machine according to claim 1, wherein the anomalous-state-velocity end position is set so as to precede a start point of the monitor region.

8. A mold-clamping control method for an injection molding machine according to claim 7, wherein, when the anomalous-state-velocity end position is reached, the mold opening control is performed on the basis of the normal-state mold opening velocity.

9. A mold-clamping control method for an injection molding machine according to claim 1, wherein the monitor item is torque of a servomotor for performing the mold closing operation.

10. A mold-clamping control method for an injection molding machine according to claim 9, wherein the detection value is a differential detection value obtained by differentiating a torque detection value corresponding to the torque.

11. A mold-clamping control method for an injection molding machine according to claim 1, wherein the monitor item is velocity of a servomotor for performing the mold closing operation.

12. A mold-clamping control method for an injection molding machine according to claim 11, wherein the detection value is a differential detection value obtained by differentiating a velocity detection value corresponding to the velocity.

* * * * *